United States Patent
Dixon

(10) Patent No.: US 8,876,096 B2
(45) Date of Patent: Nov. 4, 2014

(54) METHOD AND APPARATUS FOR FORMING AN ANGLED FLANGE

(75) Inventor: Robert D. Dixon, Everett, WA (US)

(73) Assignee: The Boeing Company, Chicago, IL (US)

( * ) Notice: Subject to any disclaimer, the term of this patent is extended or adjusted under 35 U.S.C. 154(b) by 87 days.

(21) Appl. No.: 13/542,013

(22) Filed: Jul. 5, 2012

(65) Prior Publication Data
US 2014/0008854 A1    Jan. 9, 2014

(51) Int. Cl.
| B25B 1/00 | (2006.01) |
| B25B 1/06 | (2006.01) |
| B25B 1/16 | (2006.01) |
| B29C 33/22 | (2006.01) |
| B25B 11/00 | (2006.01) |

(52) U.S. Cl.
USPC .............................. 269/8; 269/216; 249/139

(58) Field of Classification Search
CPC .......... B23Q 3/1543; B23Q 3/02; B23Q 3/04; B23Q 3/06; B23Q 3/106; B23Q 3/107; B23Q 3/108; B23Q 3/186; B23Q 3/062
USPC ............................................................. 269/8
See application file for complete search history.

(56) References Cited

U.S. PATENT DOCUMENTS

| 1,828,791 | A | * | 10/1931 | Thompson | 269/8 |
| 3,319,989 | A | * | 5/1967 | Ross | 294/65.5 |
| 5,066,936 | A | * | 11/1991 | Hsu | 335/295 |
| 5,993,365 | A | * | 11/1999 | Stagnitto et al. | 483/59 |
| 6,070,718 | A | * | 6/2000 | Drabwell | 206/216 |
| 6,145,799 | A | * | 11/2000 | Khon | 248/442.2 |
| 6,188,147 | B1 | * | 2/2001 | Hazelton et al. | 310/12.06 |
| 6,202,978 | B1 | * | 3/2001 | Vappula | 249/187.1 |
| 6,471,273 | B1 | * | 10/2002 | Friedrich et al. | 294/65.5 |
| 6,547,209 | B1 | * | 4/2003 | Vappula | 249/139 |
| 6,742,759 | B2 | * | 6/2004 | Vappula | 249/139 |
| 6,987,335 | B2 | * | 1/2006 | Korenaga | 310/12.15 |
| 7,108,461 | B1 | * | 9/2006 | Colburn et al. | 409/131 |
| 7,419,131 | B2 | * | 9/2008 | Von Limburg | 249/139 |
| 7,850,142 | B2 | * | 12/2010 | Sladojevic et al. | 249/219.1 |
| 7,887,022 | B2 | * | 2/2011 | Von Limburg et al. | 249/139 |
| 8,205,846 | B2 | * | 6/2012 | Glunk | 248/309.4 |

(Continued)

FOREIGN PATENT DOCUMENTS

| JP | 2003251714 | 9/2003 |
| JP | 2010274457 | 9/2010 |

OTHER PUBLICATIONS

EP Search Report, dated Oct. 9, 2013, regarding Application No. EP13173508.6, 4 pages.

*Primary Examiner* — Lee D Wilson
*Assistant Examiner* — Alvin Grant
(74) *Attorney, Agent, or Firm* — Yee & Associates, P.C.

(57) ABSTRACT

A method and apparatus comprising a structure and a locking magnet. The structure comprises a retaining portion and a magnetic portion. The retaining portion of the structure is configured to receive a first section of a workpiece such that a second section of the workpiece is positioned at an angle relative to the magnetic portion of the structure. The magnetic portion of the structure is positioned at a first side of the workpiece. The locking magnet is configured to exert an attractive force that causes the magnetic portion of the structure to move towards the second section of the workpiece when the locking magnet is positioned at a second side of the workpiece.

13 Claims, 13 Drawing Sheets

(56) References Cited

U.S. PATENT DOCUMENTS

| | | | |
|---|---|---|---|
| 8,215,624 B2* | 7/2012 | Tomioka et al. | 269/55 |
| 8,292,242 B2* | 10/2012 | Thompson | 248/206.5 |
| 8,646,763 B2* | 2/2014 | Cardone et al. | 269/8 |
| 2005/0116131 A1* | 6/2005 | Samuel | 248/357 |
| 2005/0269758 A1* | 12/2005 | Sears et al. | 269/266 |
| 2006/0071385 A1* | 4/2006 | Berset et al. | 269/216 |
| 2011/0018182 A1* | 1/2011 | Day et al. | 269/8 |
| 2012/0042431 A1* | 2/2012 | Lee | 2/48 |

\* cited by examiner

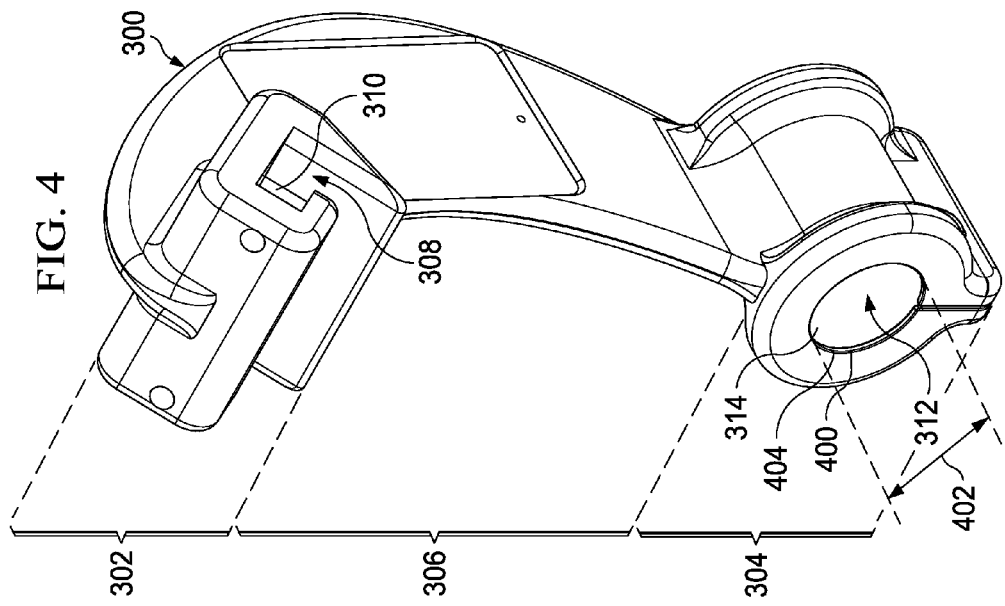
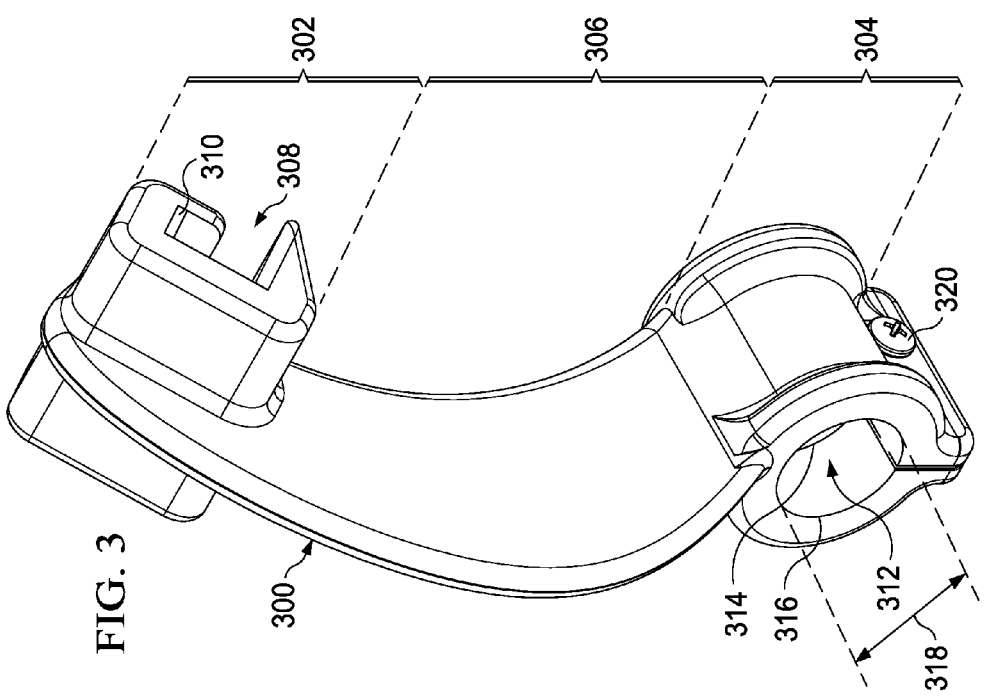

METHOD AND APPARATUS FOR FORMING AN ANGLED FLANGE

BACKGROUND INFORMATION

1. Field

The present disclosure relates generally to forming flanges on parts, and in particular, to forming angled flanges on parts. Still more particularly, the present disclosure relates to a method and apparatus for bending a workpiece to form an angled flange.

2. Background

Different types of objects may be formed using a part having a flange. As used herein, a "flange" may be a protruding ridge, a rim, a collar, a rib, or some other type of extension on a part. In some cases, the flange on a part may be angled with respect to another portion of the part. This type of flange may be referred to as an "angled flange".

Different types of tools may be used to form an angled flange on a part. For example, without limitation, various tools may be used to bend the flange on a part relative to the rest of the part to form an angled flange. The angled flange may be formed at some selected angle relative to the rest of the part. The tools used to form these angled flanges may be referred to as "bend tools". In some cases, these bend tools may be used to hold the part with the angled flange at selected angles relative to the rest of the part, while the part is cured, heated, hardened, or processed in some other manner.

However, some currently available bend tools may be heavier and/or larger than desired. Transporting these heavy tools to various locations for use with different parts may be more difficult than desired. Further, using these types of bend tools on a moving line or an assembly line in a manufacturing facility may be more difficult than desired.

The increased weight and size of these currently available bend tools may increase the energy needed to perform heating and/or curing operations during manufacturing and fabrication. For example, without limitation, when placed in an oven or an autoclave, a bend tool may block heat and/or draw heat away from the part being held by the bend tool. Further, as the size of the bend tool increases, the energy needed to heat the bend tool also increases.

Additionally, some currently available bend tools may only be configured for use with a particular type of part. Consequently, using part-specific bend tools to form an object comprised of multiple parts that require angled flanges may be more expensive than desired. Therefore, it would be desirable to have a method and apparatus that takes into account at least some of the issues discussed above, as well as other possible issues.

SUMMARY

In one illustrative embodiment, an apparatus may comprise a structure and a locking magnet. The structure may comprise a retaining portion and a magnetic portion. The retaining portion of the structure may be configured to receive a first section of a workpiece such that a second section of the workpiece is positioned at an angle relative to the magnetic portion of the structure. The magnetic portion of the structure may be positioned at a first side of the workpiece. The locking magnet may be configured to exert an attractive force that causes the magnetic portion of the structure to move towards the second section of the workpiece when the locking magnet is positioned at a second side of the workpiece.

In another illustrative embodiment, a bending system may comprise a group of structures, a group of locking magnets, a group of clamping magnets, and a rigid elongate member. Each structure in the group of structures may comprise a retaining portion and a magnetic portion. The retaining portion of each structure may have a slot configured to receive a first section of a workpiece such that a second section of the workpiece is positioned at an angle relative to the magnetic portion of each structure and the magnetic portion of each structure is positioned at a first side of the workpiece. The group of locking magnets may be configured to exert a group of attractive forces. Each clamping magnet in the group of clamping magnets may be associated with the magnetic portion of a corresponding structure in the group of structures. The group of attractive forces exerted by the group of locking magnets, when the group of locking magnets is positioned at the second side of the workpiece, may be configured to cause the group of clamping magnets to move towards the second section of the workpiece, while the second section of the workpiece remains in a substantially fixed position. The group of clamping magnets may move towards the second section of the workpiece until the magnetic portion of each structure in the group of structures contacts a surface of the second section of the workpiece. The first section of the workpiece may bend relative to the second section of the workpiece to form an angled flange when the magnetic portion of the structure moves towards the second section of the workpiece. The rigid elongate member may have a substantially planar shape. The slot may be configured to receive both the rigid elongate member and the first section of the workpiece such that the first section of the workpiece remains substantially planar when the first section of the workpiece bends relative to the second section of the workpiece.

In yet another illustrative embodiment, a method for bending a workpiece may be provided. A first section of the workpiece may be received within a retaining portion of a structure. A second section of the workpiece may be positioned at an angle relative to a magnetic portion of the structure. The magnetic portion of the structure may be positioned at a first side of the workpiece.

In yet another illustrative embodiment, a method for forming an angled flange may be provided. A rigid elongate member and a first section of a workpiece may be received within a slot in a retaining portion of each structure in a group of structures such that a second section of the workpiece is positioned at an angle relative to a magnetic portion of each structure and the magnetic portion of each structure is positioned at a first side of the workpiece. The second section of the workpiece may be held in a substantially fixed position relative to the magnetic portion of each structure in the group of structures. A group of locking magnets may be positioned at a second side of the workpiece. The group of locking magnets may exert a number of attractive forces configured to cause a clamping magnet associated with the magnetic portion of each structure to move towards the second section of the workpiece until the magnetic portion of each structure contacts a surface of the second section of the workpiece. The first section of the workpiece may be bent relative to the second section of the workpiece at a groove in the workpiece in response to the magnetic portion of each structure moving towards the second section of the workpiece. The rigid elongate member may keep the first section of the workpiece substantially planar when the first section of the workpiece bends relative to the second section of the workpiece.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a front isometric view of a structure for a bending system in accordance with an illustrative embodiment;

FIG. 4 is an illustration of a back isometric view of a structure in accordance with an illustrative embodiment;

DETAILED DESCRIPTION

The different illustrative embodiments recognize and take into account different considerations. For example, without limitation, the different illustrative embodiments recognize and take into account that it may be desirable to have a bend tool that may be used on a moving line or an assembly line in a manufacturing facility. Further, the different illustrative embodiments recognize and take into account that it may be desirable to have a bend tool that is less expensive than some currently available bend tools. Still further, the different illustrative embodiments recognize and take into account that having a bend tool that can be used to bend flanges of varying lengths to form angled flanges may be desirable.

Thus, the different illustrative embodiments provide a method and apparatus for bending a workpiece. In one illustrative embodiment, an apparatus may comprise a structure and a locking magnet. The structure may comprise a retaining portion and a magnetic portion. The retaining portion of the structure may be configured to receive a first section of a workpiece such that a second section of the workpiece is positioned at an angle relative to the magnetic portion of the structure. The magnetic portion of the structure may be positioned at a first side of the workpiece. The locking magnet may be configured to exert an attractive force that causes the magnetic portion of the structure to move towards the second section of the workpiece when the locking magnet is positioned at a second side of the workpiece.

Figure 1:
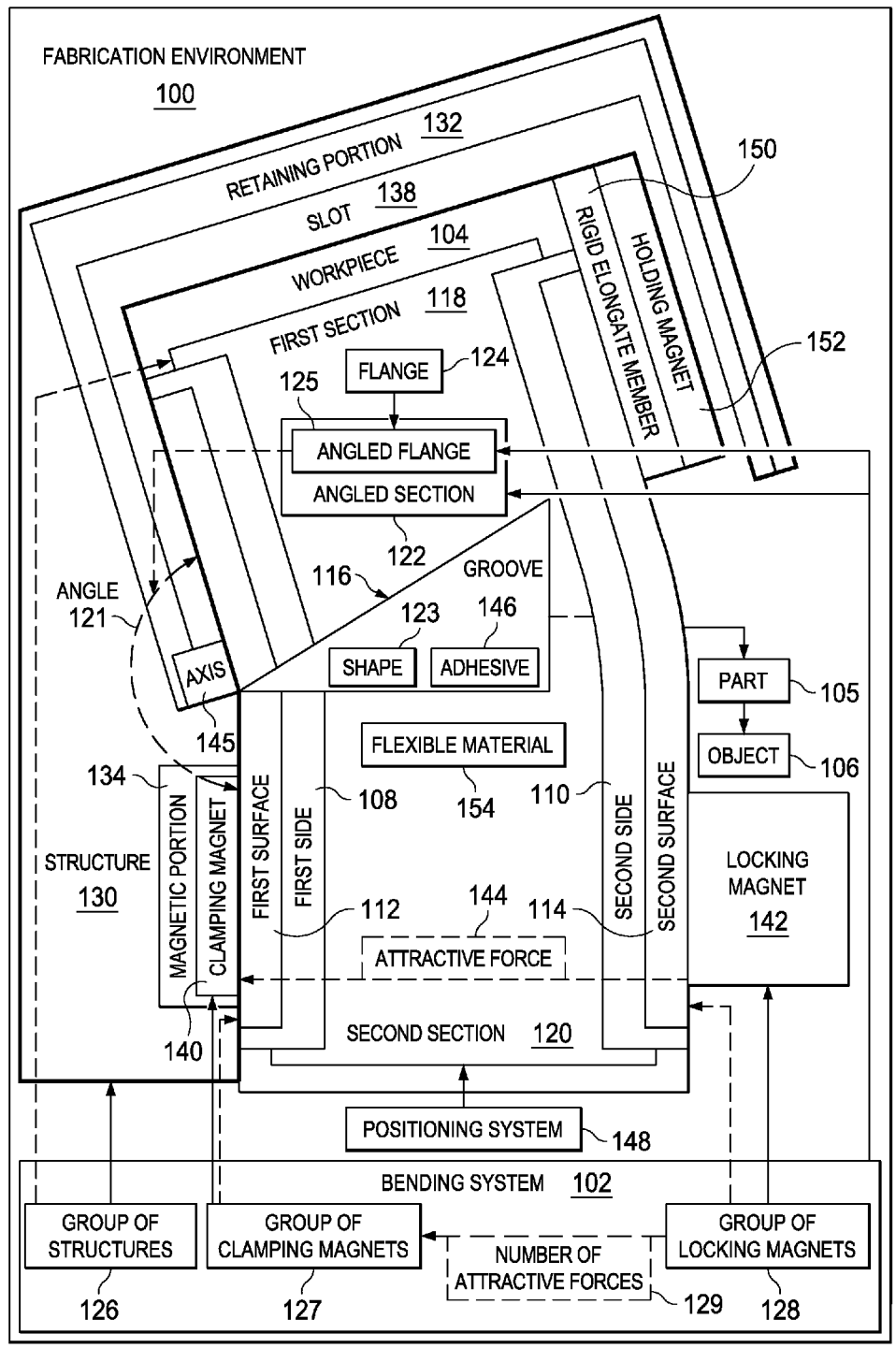
FIG. 1 is an illustration of a fabrication environment in the form of a block diagram in accordance with an illustrative embodiment.

With reference now to FIG. 1, an illustration of a fabrication environment in the form of a block diagram is depicted in accordance with an illustrative embodiment. In FIG. 1, fabrication environment 100 may be an example of one environment in which bending system 102 may be used to bend workpiece 104. Bending system 102 may also be referred to as a bending tool or a bend tool in some illustrative examples.

As depicted, workpiece 104 may be bent to form part 105. In these illustrative examples, part 105 may be formed for use in manufacturing, assembling, reworking, and/or otherwise forming object 106. Object 106 may be selected from one of any number of different types of objects. For example, without limitation, object 106 may be selected from one of an overhead bin in an aircraft, a fuselage of an aircraft, a door, a tool, a table, a seat in a seating system, a connection mechanism, a bracket, a duct, or some other type of object. However, in other illustrative examples, workpiece 104 may be bent to form a new workpiece that will be used to form part 105 for object 106.

In these illustrative examples, workpiece 104 may have first side 108 and second side 110. Workpiece 104 may have first surface 112 at first side 108 and second surface 114 at second side 110. As depicted, groove 116 may be formed on first side 108 of workpiece 104. In particular, groove 116 may comprise an opening at first surface 112 of workpiece 104 that extends towards second surface 114 of workpiece 104.

Groove 116 may separate first section 118 of workpiece 104 and second section 120 of workpiece 104. In these illustrative examples, first section 118 and second section 120 may be substantially planar prior to any bending of workpiece 104 by bending system 102. Bending system 102 may be used to bend first section 118 of workpiece 104 relative to second section 120 of workpiece 104 at groove 116 to form angled section 122.

In one illustrative example, first section 118 may be referred to as flange 124 and angled section 122 may be referred to as angled flange 125. In this manner, bending system 102 may bend flange 124 at groove 116 to form angled flange 125. In particular, flange 124 may be bent at angle 121 relative to second section 120 of workpiece 104.

In some illustrative examples, groove 116 may have shape 123 configured to allow first section 118 of workpiece 104 to bend without increasing the stress to which workpiece 104 is subjected when first section 118 bends more than desired. Shape 123 may be, for example, without limitation, a triangular prism shape, a rectangular prism shape, or some other type of shape.

Of course, in other illustrative examples, groove 116 may not be present on workpiece 104. Instead, bending system 102 may bend first section 118 relative to second section 120 of workpiece 104 at the interface between first section 118 and second section 120 without groove 116 being present on first side 108 of workpiece 104.

In these illustrative examples, bending system 102 may comprise group of structures 126, group of clamping magnets 127, and group of locking magnets 128. As used herein, a "group of" items may mean one or more items. For example, without limitation, group of structures 126 may be one or more structures, group of clamping magnets 127 may be one or more clamping magnets, and group of locking magnets 128 may be one or more locking magnets.

In some cases, a "structure" in group of structures 126 may also be referred to as a clamp. In this manner, group of structures 126 may be referred to as a group of clamps.

Group of clamping magnets 127 may be associated with group of structures 126. When one component is "associated" with another component, the association may be a physical association in the depicted examples. For example, without limitation, structure 130 may be an example of a structure in group of structures 126 and clamping magnet 140 may be an example of a clamping magnet in group of clamping magnets 127. Clamping magnet 140 may be associated with structure 130.

As used herein, a first component, such as clamping magnet 140, may be considered to be associated with a second component, such as structure 130, by being secured to the second component, bonded to the second component, mounted to the second component, welded to the second component, fastened to the second component, and/or connected to the second component in some other suitable manner. Additionally, the first component may be connected to the second component using a third component. The first component may also be considered to be associated with the second component by being formed as part of and/or an extension of the second component.

Depending on the implementation, group of clamping magnets 127 may be held by, attached to, fastened to, and/or otherwise associated with group of structures 126. Group of structures 126 may be configured to receive first section 118 of workpiece 104. The association of group of clamping magnets 127 with group of structures 126 and the configuration of group of structures 126 may be selected such that group of clamping magnets 127 is positioned away from first surface 112 of second section 120 of workpiece 104 when group of structures 126 receives first section 118 of workpiece 104.

As depicted, group of locking magnets 128 may exert number of attractive forces 129. Group of clamping magnets 127 may be attracted to number of attractive forces 129 exerted by group of locking magnets 128. This attraction may cause group of clamping magnets 127 to move towards first surface 112 of second section 120 of workpiece 104 when group of locking magnets 128 is positioned at second surface 114 of workpiece 104. In particular, group of clamping magnets 127 may move towards first surface 112 of second section 120 of workpiece 104 in a manner such that first section 118 bends relative to second section 120 of workpiece 104.

For example, without limitation, structure 130 may comprise retaining portion 132 and magnetic portion 134. In these illustrative examples, retaining portion 132 may be configured to receive first section 118 of workpiece 104 such that second section 120 of workpiece 104 is positioned at an angle relative to magnetic portion 134 of structure 130.

In one illustrative example, retaining portion 132 may have slot 138 configured to receive and retain first section 118 of workpiece 104. For example, without limitation, retaining portion 132 may be positioned over first section 118 of workpiece 104 such that slot 138 receives first section 118 of workpiece 104 and such that magnetic portion 134 of structure 130 is located at first side 108 of workpiece 104. In particular, retaining portion 132 may be positioned over first section 118 of workpiece 104 such that magnetic portion 134 of structure 130 is positioned at an angle relative to first surface 112 of second section 120 of workpiece 104.

Clamping magnet 140 may be associated with magnetic portion 134 of structure 130. In one illustrative example, each clamping magnet in group of clamping magnets 127 may be associated with a magnetic portion of a corresponding structure in group of structures 126. Of course, in other illustrative examples, group of clamping magnets 127 may comprise a single clamping magnet configured to be associated with all of the structures in group of structures 126. For example, without limitation, clamping magnet 140 may be the only clamping magnet in group of clamping magnets 127 in some cases.

As depicted, locking magnet 142 may be an example of one locking magnet in group of locking magnets 128. In one illustrative example, each locking magnet in group of locking magnets 128 may correspond to a clamping magnet in group of clamping magnets 127. Of course, in other illustrative examples, group of locking magnets 128 may comprise a single locking magnet configured to correspond to all of the clamping magnets in group of clamping magnets 127. For example, without limitation, locking magnet 142 may be the only locking magnet in group of locking magnets 128.

In these illustrative examples, locking magnet 142 may be configured to exert attractive force 144. Attractive force 144 may be one of number of attractive forces 129 exerted by group of locking magnets 128.

Once first section 118 of workpiece 104 has been retained by retaining portion 132 of structure 130, locking magnet 142 may be positioned relative to second side 110 of workpiece 104. In some illustrative examples, locking magnet 142 may be positioned on second surface 114 of workpiece 104 at second side 110 of workpiece 104.

Attractive force 144 exerted by locking magnet 142 may cause clamping magnet 140 to move towards second section 120 of workpiece 104 when locking magnet 142 is positioned on second surface 114 at second side 110 of workpiece 104. The movement of clamping magnet 140 towards second section 120 of workpiece 104 may be relative to the movement between clamping magnet 140 and second section 120 of workpiece 104.

Additionally, attractive force 144 exerted by locking magnet 142 may cause clamping magnet 140, and thus, magnetic portion 134 of structure 130, to move towards first surface 112 of second section 120 of workpiece 104 until magnetic portion 134 contacts first surface 112. In these illustrative examples, attractive force 144 exerted by locking magnet 142 may cause clamping magnet 140 and locking magnet 142 to remain in substantially locked positions against first surface 112 and second surface 114, respectively, of second section 120 of workpiece 104. In other words, locking magnet 142 may be configured to lock clamping magnet 140, and thereby structure 130, into a locked position relative to workpiece 104.

The movement of magnetic portion 134 of structure 130 towards second section 120 of workpiece 104 may be a rotation of magnetic portion 134 about axis 145 through structure 130. In one illustrative example, axis 145 may extend through retaining portion 132 of structure 130. More specifically, axis 145 may extend through an end or edge of slot 138 in retaining portion 132 of structure 130.

The rotation of magnetic portion 134 of structure 130 towards second section 120 of workpiece 104 may cause first section 118 of workpiece 104 to bend relative to second section 120 when second section 120 of workpiece 104 remains in a substantially fixed position relative to magnetic portion 134 of structure 130.

In these illustrative examples, positioning system 148 may be configured to hold second section 120 of workpiece 104 in a substantially fixed position while magnetic portion 134 of structure 130 rotates towards second section 120 of workpiece 104. Positioning system 148 may take a number of different forms. In one illustrative example, positioning system 148 may be a clamping system. In another illustrative example, positioning system 148 may be a rigid structure configured to hold second section 120 of workpiece 104 in a substantially fixed position.

In some illustrative examples, slot 138 may be configured to receive and retain rigid elongate member 150 in addition to first section 118 of workpiece 104. Rigid elongate member 150 may take various forms. Rigid elongate member 150 may take the form of, for example, without limitation, a rod, a beam, a stiffening structure, an elongate part, a rib, a plate, or some other type of rigid elongate member.

Rigid elongate member 150 may be comprised of a magnetic material in one illustrative example. In this example, holding magnet 152 may be associated with slot 138. Slot 138 may be configured to receive rigid elongate member 150 and holding magnet 152 may be configured to hold rigid elongate member 150 in place within slot 138. In this manner, rigid elongate member 150 may be magnetically attached to retaining portion 132 of structure 130 within slot 138 by holding magnet 152. Depending on the implementation, rigid elongate member 150 may be magnetically attached to retaining portion 132 prior to retaining portion 132 being placed over first section 118 of workpiece 104.

In other illustrative examples, rigid elongate member 150 may be associated with first section 118 of workpiece 104 on second surface 114 of workpiece 104. For example, without limitation, rigid elongate member 150 may be fastened to first section 118 of workpiece 104 by fasteners. In this manner, slot 138 may receive both rigid elongate member 150 and first section 118 of workpiece 104 when retaining portion 132 is placed over first section 118.

As depicted, rigid elongate member 150 may only be in contact with first section 118 of workpiece 104 and may not contact second section 120 of workpiece 104. Rigid elongate member 150 may be configured to keep first section 118 of workpiece 104 substantially planar when first section 118 bends in response to magnetic portion 134 of structure 130 rotating towards first surface 112 of second section 120 of workpiece 104. In this manner, angled section 122 may be substantially planar or substantially flat.

In one illustrative example, adhesive 146 may be present inside groove 116. Adhesive 146 may be applied to groove 116 prior to first section 118 of workpiece 104 being bent. After angled section 122 has been formed, bending system 102 may hold angled section 122 at angle 121 relative to second section 120 of workpiece 104 for some selected amount of time to allow adhesive 146 to harden. Once adhesive 146 hardens, angled section 122 may remain substantially at angle 121 relative to second section 120 of workpiece 104 after bending system 102 is detached from workpiece 104.

In these illustrative examples, workpiece 104 may be comprised of flexible material 154. Flexible material 154 may be any material configured to bend without causing undesired inconsistencies to form on and/or in workpiece 104. Flexible material 154 may comprise, for example, without limitation, a composite material, a flexible metal material, a flexible metal alloy, a silicone material, and/or other suitable types of flexible materials.

In some cases, structure 130 alone may be unable to bend first section 118 of workpiece 104 to form angled section 122. For example, without limitation, the number of structures in group of structures 126 needed to form angled section 122 may increase as the length of workpiece 104 increases. Further, the number of structures included in group of structures 126 may depend on the flexibility of flexible material 154. In this manner, bending system 102 may be adjustable. As one illustrative example, group of structures 126 may require at least two structures to bend workpiece 104. However, in another illustrative example, group of structures 126 may require at least five structures to bend workpiece 104.

The size and weight of each of the structures in group of structures 126 may be sufficiently reduced to allow bending system 102 to be used along a moving line or assembly line in fabrication environment 100. Further, the size and weight of each of the structures in group of structures 126 may be sufficiently reduced to give bending system 102 a desired level of portability.

The illustration of bending system 102 and workpiece 104 in fabrication environment 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

In some illustrative examples, adhesive 146 may not be used inside groove 116. Rather, a resin material or some other type of material configured to harden in response to heat and/or pressure may be used inside groove 116. In these examples, bending system 102 may hold angled section 122 at angle 121 relative to second section 120 of workpiece 104 while heat and/or pressure are applied to workpiece 104. For example, without limitation, bending system 102 may hold angled section 122 at angle 121 relative to second section 120 inside an oven. The size of group of structures 126 may reduce the possibility of bending system 102 blocking and/or drawing heat away from workpiece 104 during heating more than desired.

Turning now to FIGS. 2-11, illustrations of a process for forming a part with an angled flange are depicted in accordance with an illustrative embodiment. In FIGS. 2-11, a flange on a workpiece may be bent at a selected angle to form an angled flange.

Figure 2:
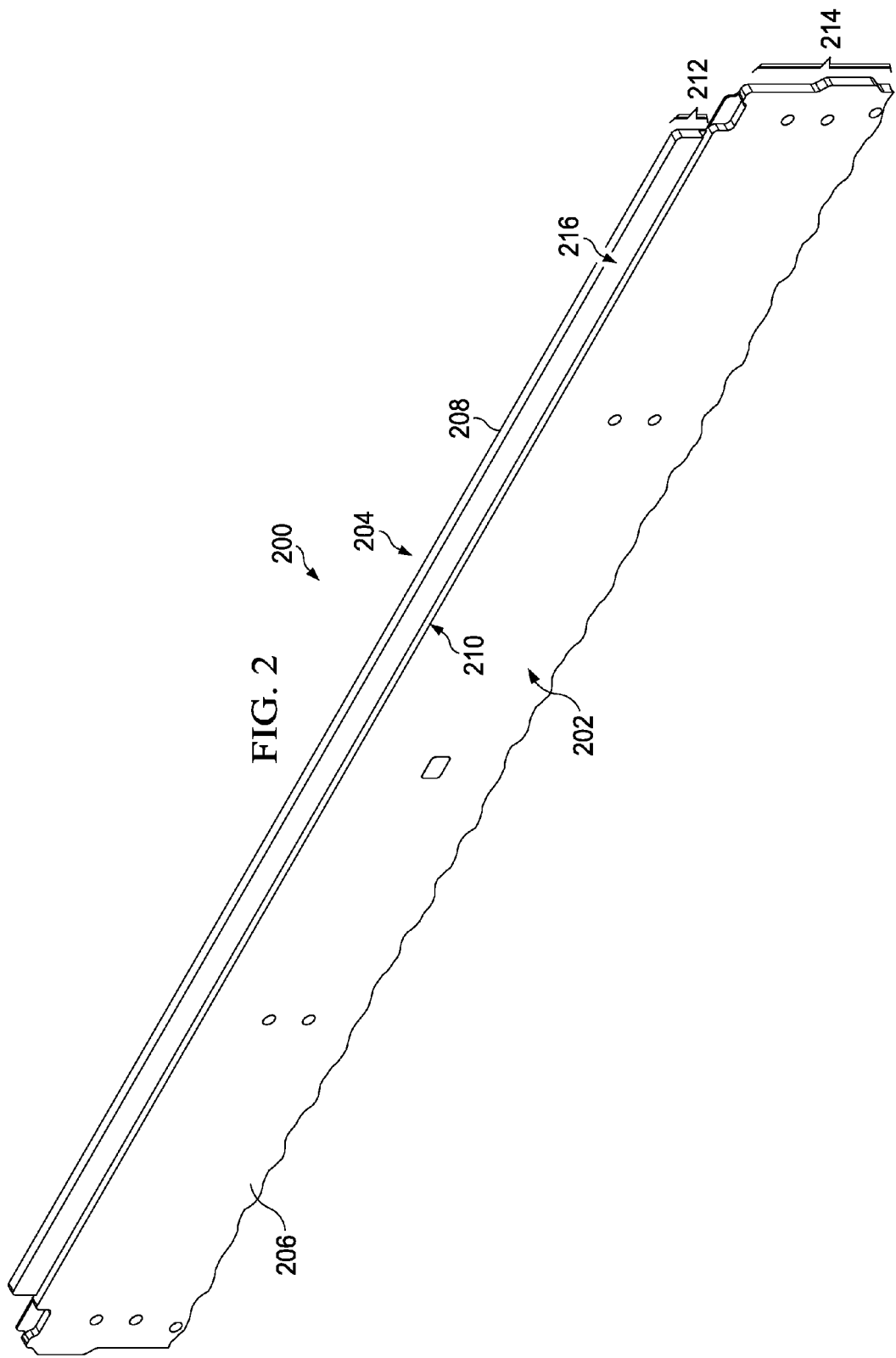
FIG. 2 is an illustration of a front isometric view of a workpiece in accordance with an illustrative embodiment.

With reference now to FIG. 2, an illustration of a front isometric view of a workpiece is depicted in accordance with an illustrative embodiment. In this illustrative example, workpiece 200 may be an example of one implementation for workpiece 104 in FIG. 1. As depicted, workpiece 200 may have first side 202 and second side 204. Further, workpiece may have first surface 206 at first side 202 and second surface 208 at second side 204.

In this illustrative example, groove 210 may separate first section 212 and second section 214 of workpiece 200. First section 212 and second section 214 may be examples of implementations for first section 118 and second section 120, respectively, of workpiece 104 in FIG. 1. Further, groove 210 may be an example of one implementation for groove 116 in FIG. 1.

As depicted, first section 212 and second section 214 may be substantially planar sections. First section 212 of workpiece 200 may also be referred to as flange 216 on workpiece 200 in these examples.

With reference now to FIG. 3, an illustration of a front isometric view of a structure for a bending system is depicted in accordance with an illustrative embodiment. In FIG. 3, structure 300 may be an example of one implementation for structure 130 in group of structures 126 in FIG. 1. Structure 300 may be one structure in a group of structures (not shown) for use in a bending system (not shown).

As depicted, structure 300 may comprise retaining portion 302, magnetic portion 304, and support portion 306. Retaining portion 302 and magnetic portion 304 may be examples of implementations for retaining portion 132 and magnetic portion 134, respectively, in FIG. 1. In this illustrative example, support portion 306 of structure 300 may be located between retaining portion 302 and magnetic portion 304.

In this illustrative example, retaining portion 302 of structure 300 may have slot 308. Slot 308 may be an example of one implementation for slot 138 in FIG. 1. Slot 308 may be configured to receive and retain first section 212 of workpiece 200 in FIG. 2. As depicted, holding magnet 310 may be associated with slot 308. Holding magnet 310 may be configured to hold a magnetic member, such as, for example, without limitation, rigid elongate member 150 in FIG. 1, in place.

Magnetic portion 304 of structure 300 may have channel 312. Channel 312 may be configured to receive and hold clamping magnet 314. Clamping magnet 314 may be an example of one implementation for clamping magnet 140 in FIG. 1. Channel 312 of magnetic portion 304 of structure 300 may have first opening 316. Clamping magnet 314 may be inserted into channel 312 through first opening 316. As depicted, first opening 316 may have first diameter 318. In this illustrative example, fastener 320 may be used to keep clamping magnet 314 in place within channel 312 of magnetic portion 304 of structure 300.

With reference now to FIG. 4, an illustration of a back isometric view of structure 300 from FIG. 3 is depicted in accordance with an illustrative embodiment. In FIG. 4, second opening 400 of channel 312 may be seen. Second opening 400 may have second diameter 402.

Second diameter 402 of second opening 400 may be smaller than first diameter 318 of first opening 316 in FIG. 3. In particular, channel 312 may have lip 404 at second opening 400. Lip 404 may be configured to reduce the possibility of clamping magnet 314 slipping out of channel 312 through second opening 400 when clamping magnet 314 is positioned relative to a locking magnet (not shown) exerting an attractive force.

Figure 5:
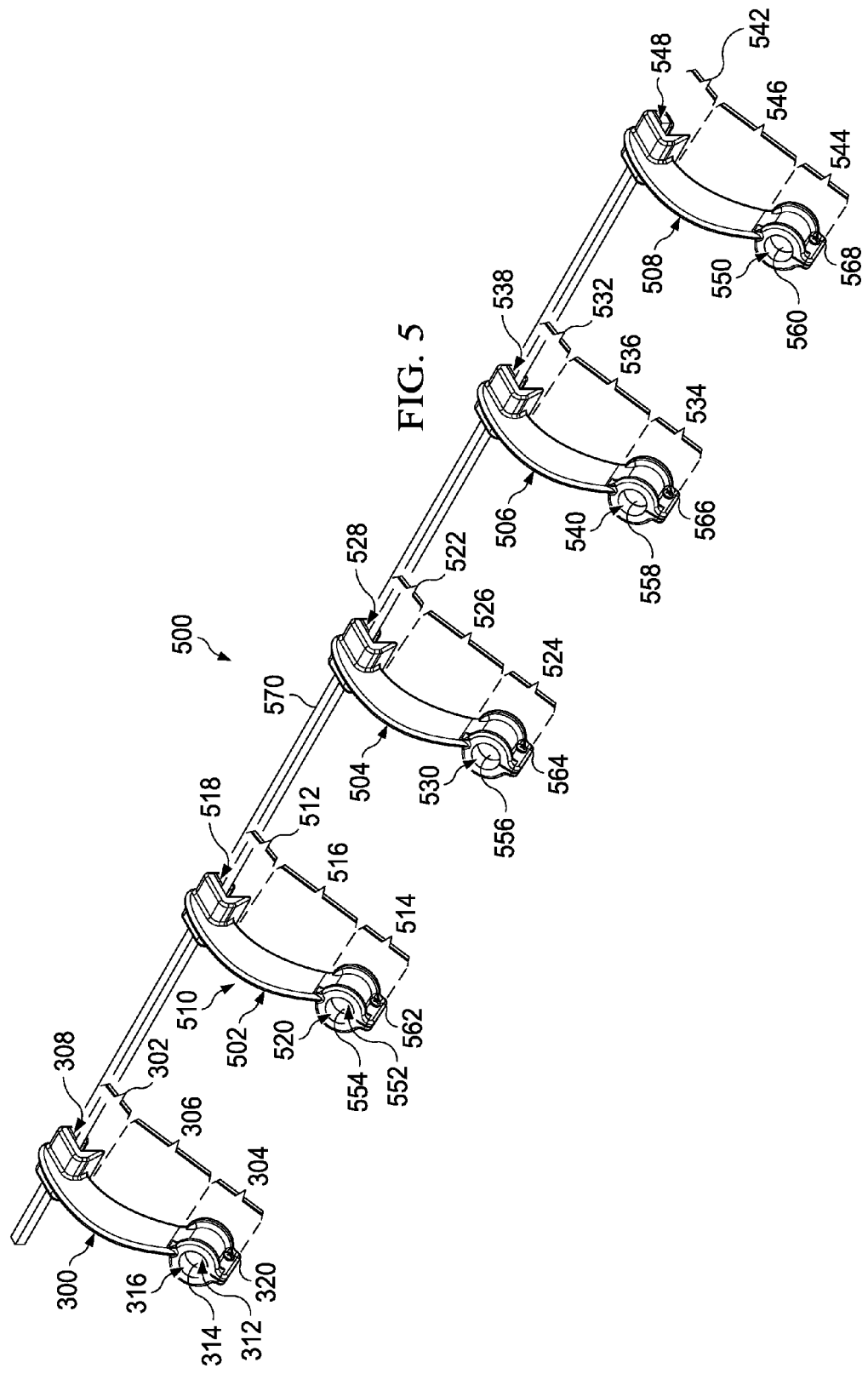
FIG. 5 is an illustration of a front isometric view of a bending system in accordance with an illustrative embodiment.

With reference now to FIG. 5, an illustration of a front isometric view of a bending system is depicted in accordance with an illustrative embodiment. In FIG. 5, bending system 500 may be an example of one implementation for bending system 102 in FIG. 1. As depicted, bending system 500 may include structure 300 from FIG. 3, as well as structures 502, 504, 506, and 508.

Structures 300, 502, 504, 506, and 508 may form group of structures 510. Group of structures 510 may be an example of one implementation for group of structures 126 in FIG. 1.

In this illustrative example, structures 502, 504, 506, and 508 in group of structures 510 may be implemented in a manner similar to structure 300. For example, without limitation, structure 502 may have retaining portion 512, magnetic portion 514, and support portion 516. Further, retaining portion 512 may have slot 518 and magnetic portion 514 may have channel 520. Additionally, structure 504 may have retaining portion 522, magnetic portion 524, and support portion 526. Further, retaining portion 522 may have slot 528 and magnetic portion 524 may have channel 530.

Structure 506 may have retaining portion 532, magnetic portion 534, and support portion 536. Further, retaining portion 532 may have slot 538 and magnetic portion 534 may have channel 540. Structure 508 may have retaining portion 542, magnetic portion 544, and support portion 546. Further, retaining portion 542 may have slot 548 and magnetic portion 544 may have channel 550.

In this illustrative example, clamping magnet 314 associated with structure 300 may be one clamping magnet in group of clamping magnets 552 associated with group of structures 510. Group of clamping magnets 552 may be an example of one implementation for group of clamping magnets 127 in FIG. 1. In this illustrative example, group of clamping magnets 552 may include clamping magnets 554, 556, 558, and 560 in addition to clamping magnet 314.

Clamping magnets 554, 556, 558, and 560 may be associated with structures 502, 504, 506, and 508, respectively, in a manner similar to the manner in which clamping magnet 314 is associated with structure 300. In particular, clamping magnets 554, 556, 558, and 560 may be held within channel 520 of structure 502, channel 530 of structure 504, channel 540 of structure 506, and channel 550 of structure 508, respectively. Further, fasteners 562, 564, 566, and 568 may be used to hold clamping magnets 554, 556, 558, and 560, respectively, in place similar to the manner in which fastener 320 is used to hold clamping magnet 314 in place within channel 312 of structure 300.

As depicted, rigid elongate member 570 may be magnetically attached to group of structures 510. For example, without limitation, rigid elongate member 570 may be comprised of a magnetic material. Rigid elongate member 570 may be inserted into slot 308 of retaining portion 302 of structure 300 and held in place within slot 308 by holding magnet 310 (not shown in this view) from FIG. 3. Similarly, rigid elongate member 570 may be held within slot 518 of structure 502, slot 528 of structure 504, slot 538 of structure 506, and slot 548 of structure 508, respectively, by holding magnets (not shown in this view) within these slots.

Figure 6:
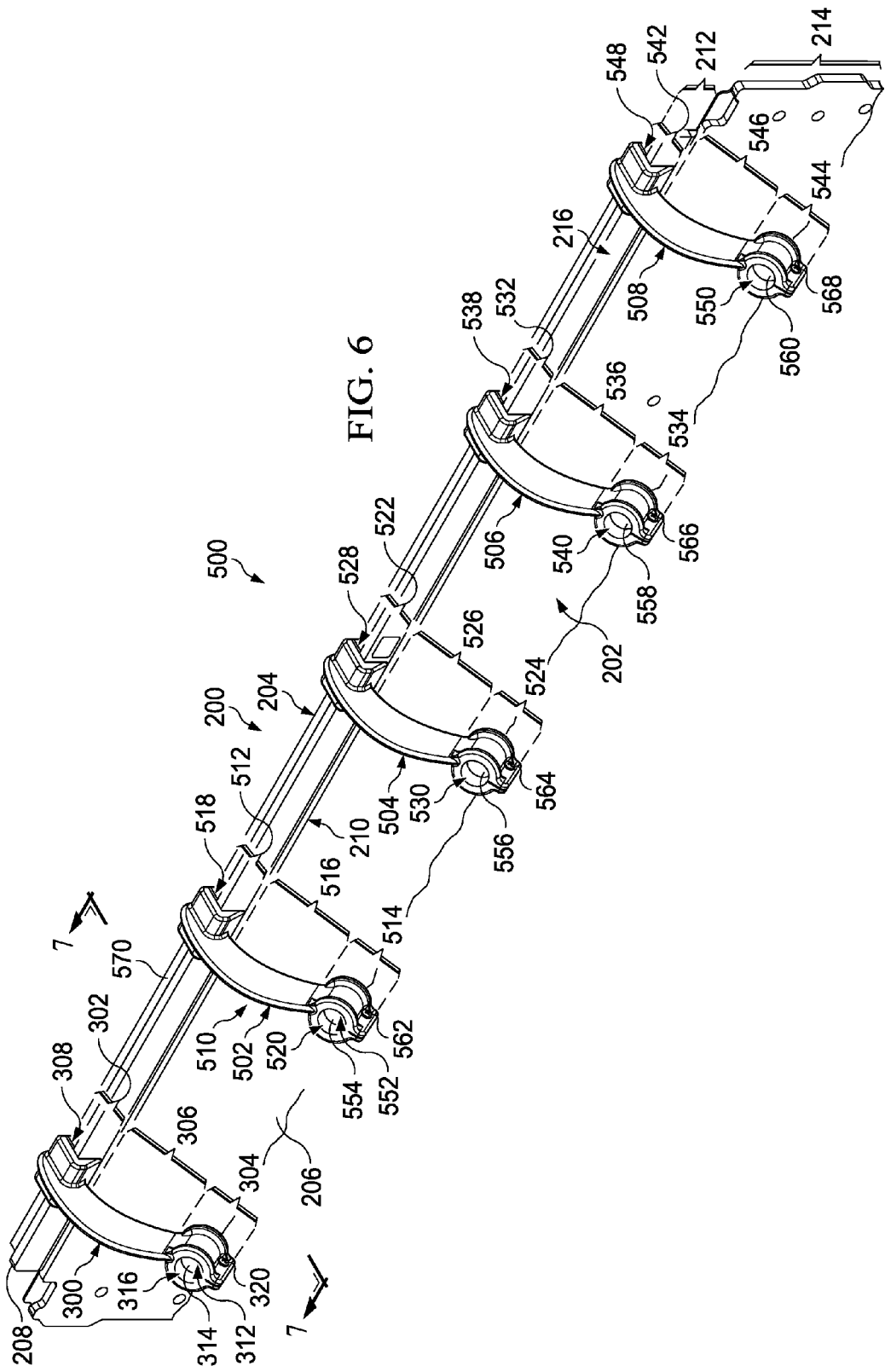
FIG. 6 is an illustration of a front isometric view of a bending system placed over a workpiece in accordance with an illustrative embodiment.

Turning now to FIG. 6, an illustration of a front isometric view of bending system 500 from FIG. 5 placed over workpiece 200 from FIG. 2 is depicted in accordance with an illustrative embodiment. In FIG. 6, bending system 500 may be placed over first section 212 of workpiece 200.

In particular, group of structures 510 may be placed over first section 212 of workpiece 200 to attach retaining portion 302 of structure 300, retaining portion 512 of structure 502, retaining portion 522 of structure 504, retaining portion 532 of structure 506, and retaining portion 542 of structure 508 to first section 212 of workpiece 200. These retaining portions of group of structures 510 may be attached to first section 212 of workpiece 200 such that slot 308 of structure 300, slot 518 of structure 502, slot 528 of structure 504, slot 538 of structure 506, and slot 548 of structure 508, receive first section 212 of workpiece 200.

Further, group of structures 510 may be placed over first section 212 of workpiece 200 such that magnetic portion 304 of structure 300, magnetic portion 514 of structure 502, magnetic portion 524 of structure 504, magnetic portion 534 of structure 506, and magnetic portion 544 of structure 508 are positioned at first side 202 of workpiece 200. In particular, the magnetic portions of group of structures 510 may be angled relative to first surface 206 of workpiece 200 such that these magnetic portions are located away from first surface 206 of workpiece 200.

Figure 7:
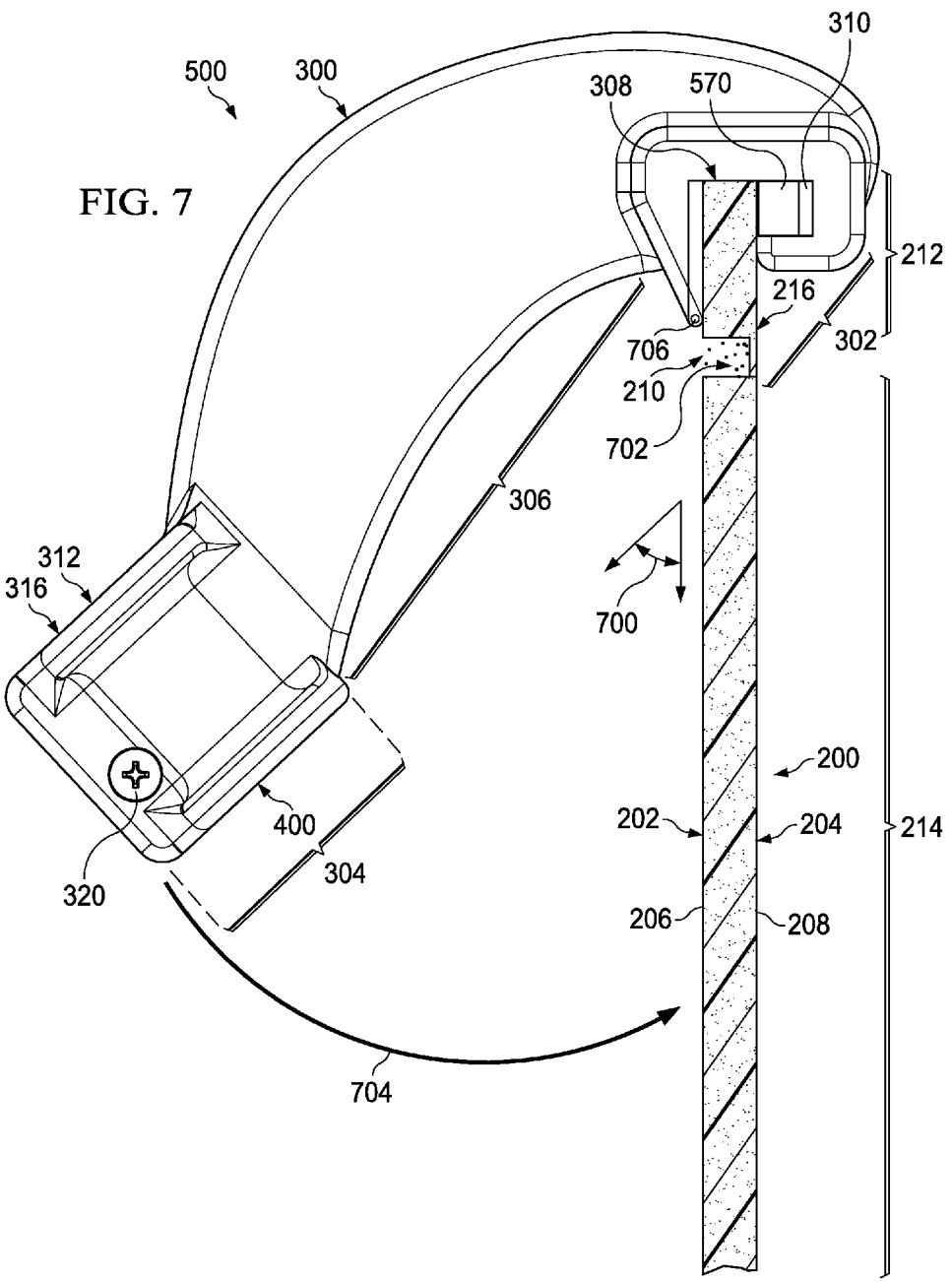
FIG. 7 is an illustration of a cross-sectional side view of a structure attached to a workpiece in accordance with an illustrative embodiment.

With reference now to FIG. 7, an illustration of a cross-sectional side view of structure 300 attached to workpiece 200 is depicted in accordance with an illustrative embodiment. A cross-sectional side view of bending system 500 attached to workpiece 200 in FIG. 6 taken along lines 7-7 in FIG. 6 is depicted in FIG. 7.

As depicted, second section 214 of workpiece 200 may be positioned at angle 700 relative to magnetic portion 304 of structure 300. In this illustrative example, retaining portion 302, magnetic portion 304, and support portion 306 may not be moveable with respect to each other. In this manner, rotation of magnetic portion 304 in a particular direction may cause rotation of retaining portion 302 in the same direction.

Consequently, rotation of magnetic portion 304 in the direction of arrow 704 about axis 706 through retaining portion 302 of structure 300 may cause retaining portion 302 to also rotate in the direction of arrow 704. This rotation of structure 300 may cause first section 212 of workpiece 200 to bend at groove 210 when second section 214 is held in a substantially fixed position relative to magnetic portion 304 of structure 300.

In this illustrative example, adhesive 702 may be applied to groove 210 of workpiece 200. Adhesive 702 may be used to hold first section 212 in a bent position when first section 212 is bent relative to second section 214 of workpiece 200.

Figure 8:
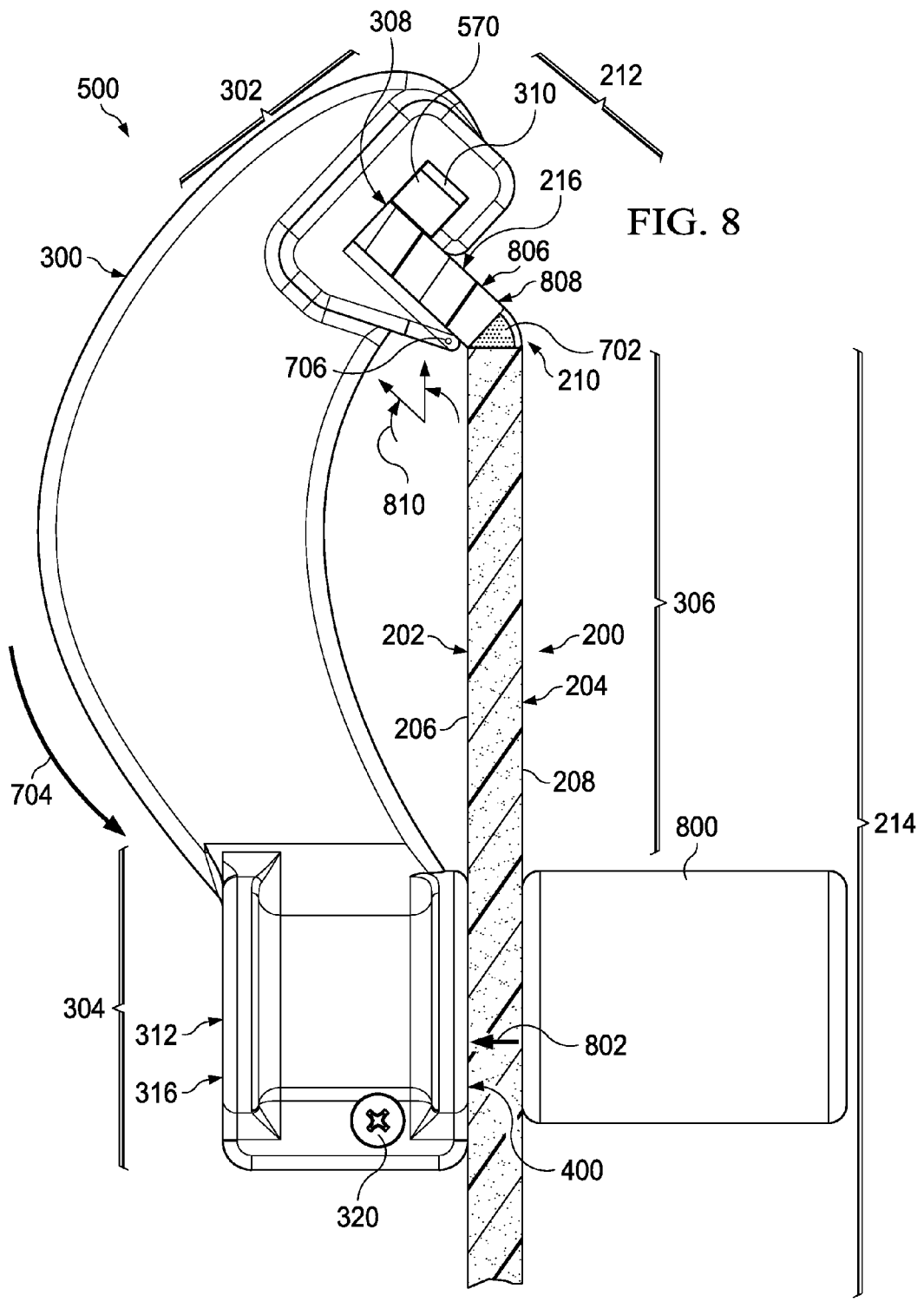
FIG. 8 is an illustration of a cross-sectional side view of a structure attached to a workpiece and a locking magnet positioned relative to the workpiece in accordance with an illustrative embodiment.

With reference now to FIG. 8, an illustration of a cross-sectional side view of structure 300 attached to workpiece 200 and a locking magnet positioned relative to workpiece 200 is depicted in accordance with an illustrative embodiment. In this illustrative example, locking magnet 800 may be positioned on second surface 208 of workpiece 200 at second side 204 of workpiece 200. Locking magnet 800 may be one locking magnet in a group of locking magnets (not shown) that may be positioned on second surface 208 of workpiece 200.

When locking magnet 800 is positioned on second surface 208, locking magnet 800 may exert attractive force 802. Clamping magnet 314 (not shown in this view) from FIG. 3 held within magnetic portion 304 of structure 300 may be attracted to locking magnet 800 in response to attractive force 802. This attraction may cause clamping magnet 314 (not shown in this view) and magnetic portion 304 of structure 300 to move towards second section 214 of workpiece 200.

In FIG. 8, clamping magnet 314 (not shown in this view) and magnetic portion 304 of structure 300 have rotated in the direction of arrow 704 about axis 706 through retaining portion 302 of structure 300 towards first surface 206 of workpiece 200 from the positions of clamping magnet 314 and magnetic portion 304 in FIG. 7. As depicted, clamping magnet 314 (not shown in this view) and magnetic portion 304 of structure 300 may be rotated in the direction of arrow 704 until magnetic portion 304 is in contact with first surface 206 of workpiece 200.

Attractive force 802 exerted by locking magnet 800 may cause clamping magnet 314 (not shown in this view) and locking magnet 800 to remain in locked positions against first surface 206 and second surface 208, respectively, of workpiece 200. In other words, attractive force 802 may cause clamping magnet 314 to be pulled up against first surface 206 and locking magnet 800 to be pulled up against second surface 208 opposite each other.

In this illustrative example, rotation of clamping magnet 314 (not shown in this view) and magnetic portion 304 of structure 300 towards first surface 206 of workpiece 200 may cause first section 212 of workpiece 200 to bend at groove 210 in workpiece 200. First section 212 of workpiece 200 may bend such that first section 212 takes the form of angled section 806. Angled section 806 may be referred to as angled flange 808. Angled section 806 may have angle 810 relative to second section 214 of workpiece 200.

Figure 9:
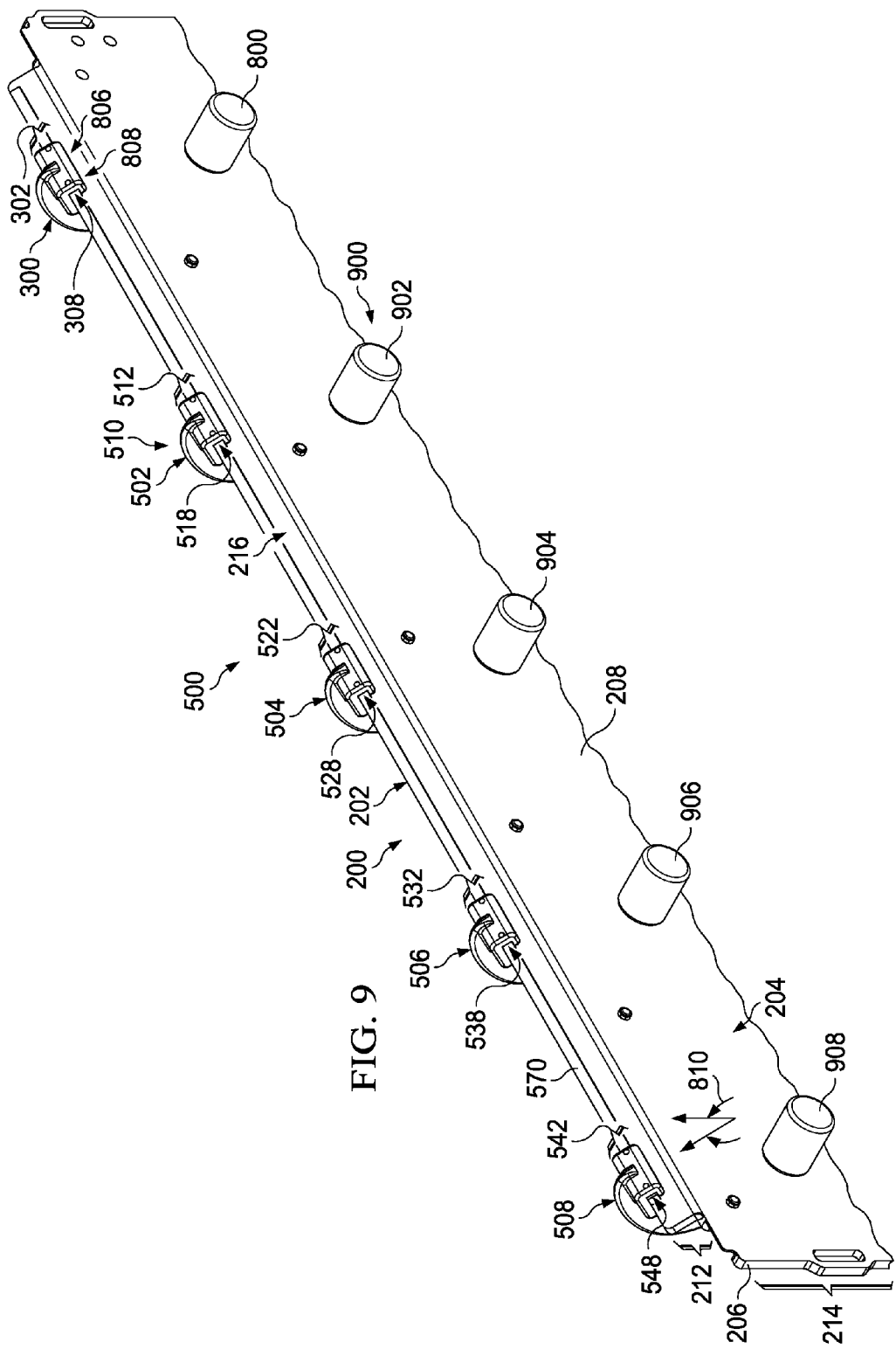
FIG. 9 is an illustration of a back isometric view of a group of locking magnets positioned on a second surface of a workpiece in accordance with an illustrative embodiment.

With reference now to FIG. 9, an illustration of a back isometric view of a group of locking magnets positioned on second surface 208 of workpiece 200 is depicted in accordance with an illustrative embodiment. In this illustrative example, group of locking magnets 900 may be positioned on second surface 208 of workpiece 200. As depicted, group of locking magnets 900 may include locking magnet 800 from FIG. 8, as well as locking magnets 902, 904, 906, and 908.

When group of locking magnets 900 is positioned on second surface 208 of workpiece 200, magnetic portion 304 (not shown in this view) of structure 300, magnetic portion 514 (not shown in this view) of structure 502, magnetic portion 524 (not shown in this view) of structure 504, magnetic portion 534 (not shown in this view) of structure 506, and magnetic portion 544 (not shown in this view) of structure 508 from FIG. 5 may rotate towards first surface 206 of workpiece 200 such that first section 212 of workpiece 200 bends to form angled section 806.

In this illustrative example, rigid elongate member 570 may be configured to keep angled section 806 substantially planar when first section 212 bends. In other words, rigid elongate member 570 may keep angled section 806 substantially planar or flat.

Figure 10:
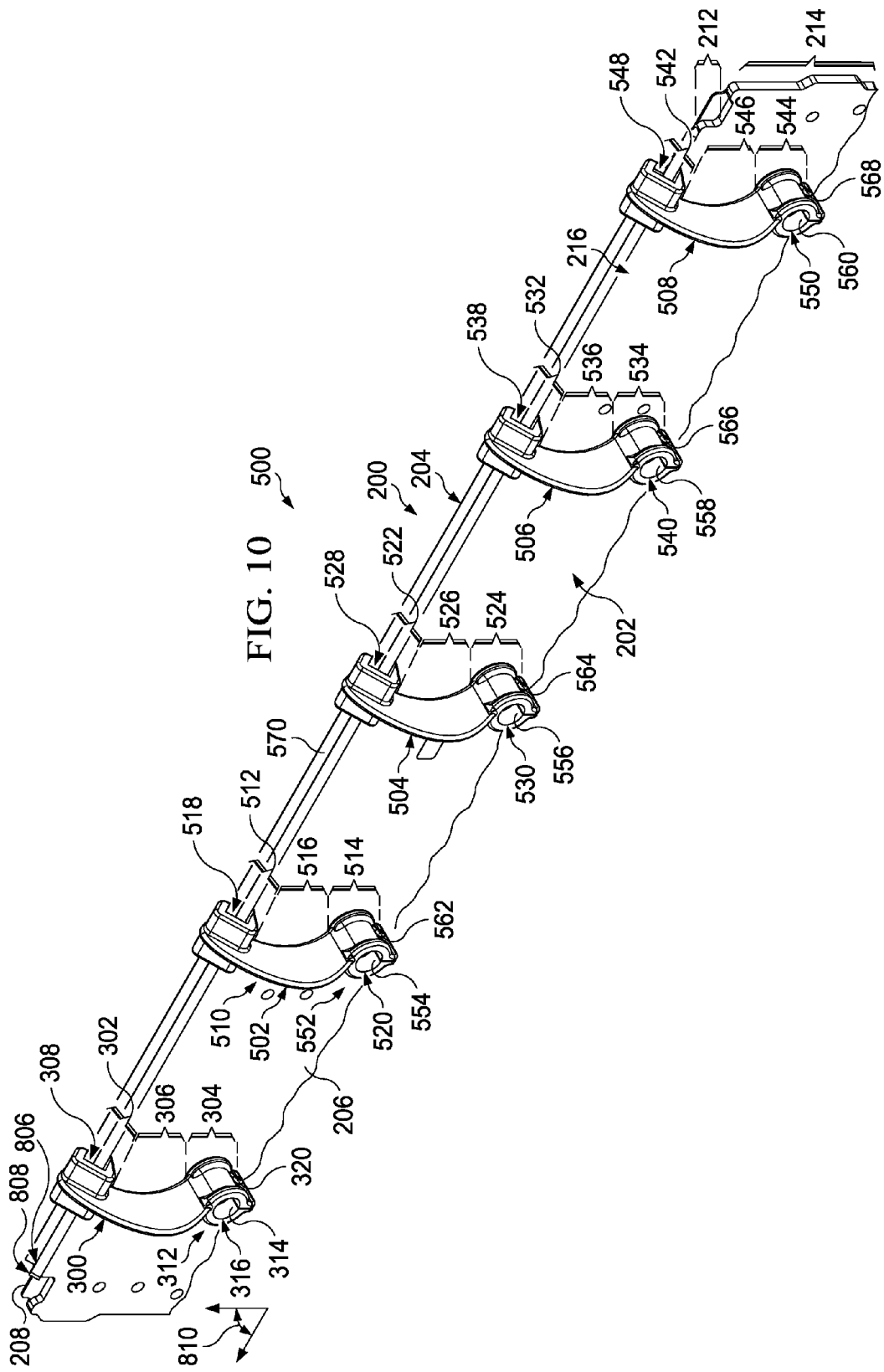
FIG. 10 is an illustration of a front isometric view of a bending system holding an angled section of a workpiece in place in accordance with an illustrative embodiment.

With reference now to FIG. 10, an illustration of a front isometric view of bending system 500 holding angled section 806 of workpiece 200 in place is depicted in accordance with an illustrative embodiment. As depicted in FIG. 9, bending system 500 may hold angled section 806 of workpiece 200 at angle 810 relative to second section 214 of workpiece 200.

Angled section 806 may be held at angle 810 for a selected amount of time until adhesive 702 (not shown in this view) from FIG. 7 hardens. In some illustrative examples, heat and/or pressure may be applied to workpiece 200 while bending system 500 holds angled section 806 of workpiece 200 at angle 810 to harden adhesive 702 (not shown in this view) from FIG. 7.

Figure 11:
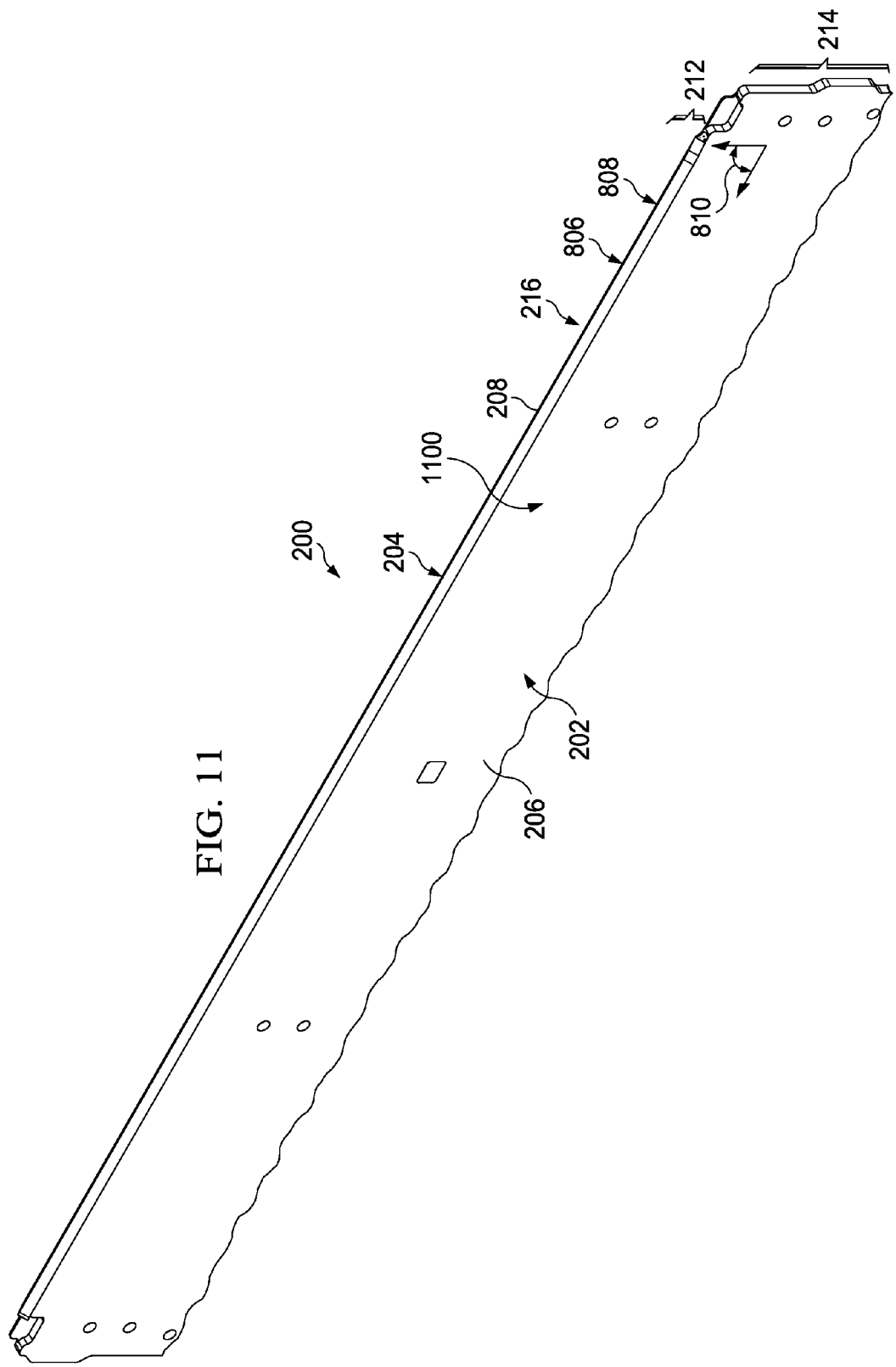
FIG. 11 is an illustration of a front isometric view of a part with an angled section in accordance with an illustrative embodiment.

With reference now to FIG. 11, an illustration of a front isometric view of a part with an angled section is depicted in accordance with an illustrative embodiment. As depicted, bending system 500 from FIGS. 5-10 may be removed from workpiece 200. Once angled section 806 has been formed, workpiece 200 may be referred to as part 1100. Part 1100 may be configured for use in an overhead bin (not shown in this view) for an aircraft.

The illustrations of workpiece 200 in FIG. 2 and FIGS. 5-10, structure 300 in FIGS. 3-4, bending system 500 in FIGS. 5-10, and part 1100 in FIG. 11 are not meant to imply physical or architectural limitations to the manner in which an illustrative embodiment may be implemented. Other components in addition to or in place of the ones illustrated may be used. Some components may be optional.

Further, the different components shown in FIGS. 2-11 may be combined with components in FIG. 1, used with components in FIG. 1, or a combination of the two. Additionally, some of the components in FIGS. 2-11 may be illustrative examples of how components shown in block form in FIG. 1 may be implemented as physical structures.

Figure 12:
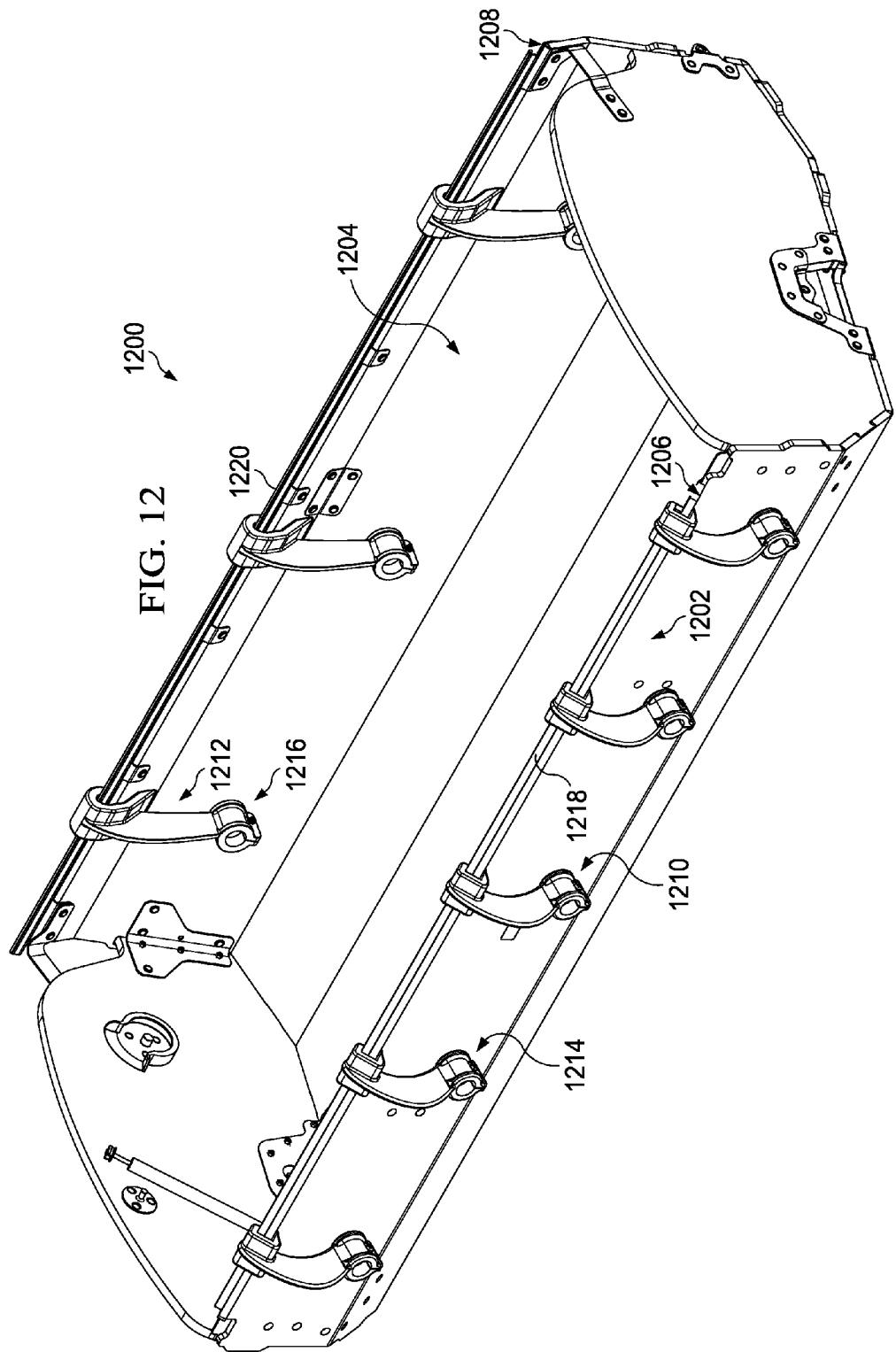
FIG. 12 is an illustration of an isometric view of a bin structure for an overhead bin for an aircraft in accordance with an illustrative embodiment.

With reference now to FIG. 12, an illustration of an isometric view of a bin structure for an overhead bin for an aircraft is depicted in accordance with an illustrative embodiment. In this illustrative example, bin structure 1200 may be a part for an overhead bin (not shown) for an aircraft (not shown). In particular, bin structure 1200 may be connected to a bin receptacle to form an overhead bin in an aircraft.

As depicted, bin structure 1200 may be formed using part 1202 and part 1204. In this illustrative example, part 1202 may have angled flange 1206 and part 1204 may have angled flange 1208.

Angled flange 1206 and angled flange 1208 may be formed using bending system 1210 and bending system 1212. Bending system 1210 and bending system 1212 may be examples of two different implementations for bending system 102 in FIG. 1. As depicted, bending system 1210 may include group of structures 1214 and bending system 1212 may include group of structures 1216.

In this illustrative example, rigid elongate member 1218 may keep angled flange 1206 substantially planar when bending system 1210 forms angled flange 1206. Rigid elongate member 1218 may be magnetically attached to group of structures 1214 prior to forming angled flange 1206. Further, rigid elongate member 1218 may be considered part of bending system 1210.

In a similar manner, rigid elongate member 1220 may keep angled flange 1208 substantially planar when bending system 1210 forms angled flange 1208. However, rigid elongate member 1220 may be associated with part 1204. In this illustrative example, rigid elongate member 1220 may be part of bin structure 1200. In this manner, rigid elongate member 1220 may not be considered part of bending system 1212.

As depicted, both bending system 1210 and bending system 1212 may be used at the same time during the assembly of bin structure 1200. Further, bending system 1210 and bending system 1212 may be left attached to part 1202 and part 1204, respectively, while other operations are performed on bin structure 1200. These operations may include, for example, without limitation, a number of assembly operations, a number of finishing operations, a number of fastening operations, and/or other types of operations.

The illustration of bin structure 1200, part 1202, part 1204, bending system 1210, and bending system 1212 in FIG. 12 is not meant to imply physical or architectural limitations to the manner in which an illustrative embodiment may be implemented. Other components in addition to or in place of the ones illustrated may be used. Some components may be optional.

Further, the different components shown in FIG. 12 may be combined with components in FIG. 1, used with components in FIG. 1, or a combination of the two. Additionally, some of the components in FIG. 12 may be illustrative examples of how components shown in block form in FIG. 1 may be implemented as physical structures.

Figure 13:
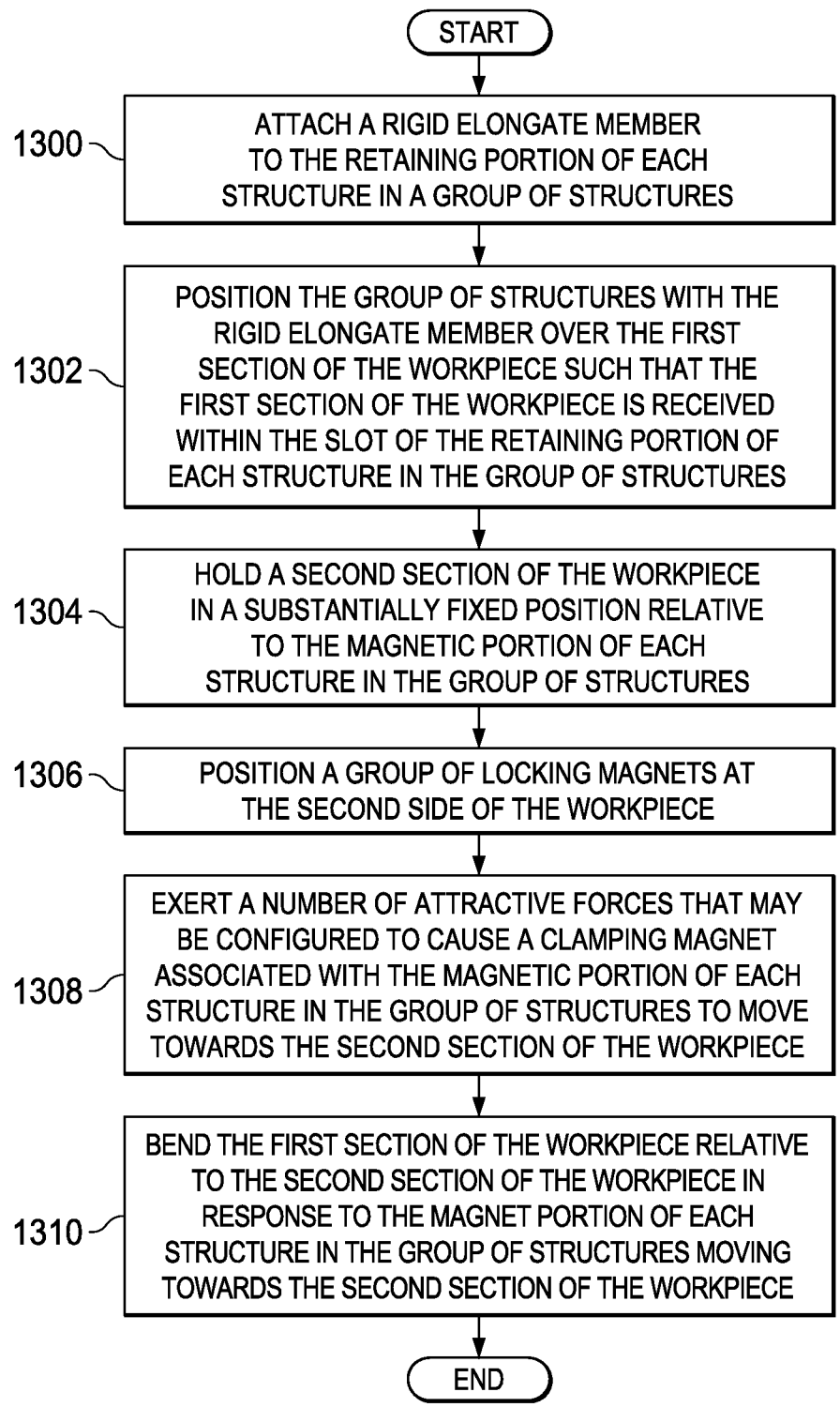
FIG. 13 is an illustration of a process for forming an angled section on a workpiece in the form of a flowchart in accordance with an illustrative embodiment.

With reference now to FIG. 13, an illustration of a process for forming an angled section on a workpiece in the form of a flowchart is depicted in accordance with an illustrative embodiment. The process illustrated in FIG. 13 may be implemented using bending system 102 in FIG. 1. In particular, this process may use bending system 102 to bend workpiece 104 to form angled section 122 in FIG. 1.

The process may begin by attaching rigid elongate member 150 to the retaining portion of each structure in group of structures 126 (operation 1300). In other words, in operation 1300, rigid elongate member 150 may be received within the retaining portion of each structure in group of structures 126.

In one illustrative example, rigid elongate member 150 may be magnetically attached within a slot in the retaining portion of each structure in group of structures 126 in operation 1300. For example, without limitation, rigid elongate member 150 may be magnetically attached to retaining portion 132 of structure 130 within slot 138 of retaining portion 132. In particular, holding magnet 152 may be used to hold rigid elongate member 150 within the retaining portion of each structure in group of structures 126.

Next, group of structures 126 with rigid elongate member 150 may be positioned over first section 118 of workpiece 104 such that first section 118 of workpiece 104 is received within the slot of the retaining portion of each structure in group of structures 126 (operation 1302). In this illustrative example, second section 120 of workpiece 104 may be positioned at an angle relative to the magnetic portion of each structure in group of structures 126 in response to operation 1302 being performed. Further, the magnetic portion of each structure in group of structures 126 may be positioned at first side 108 of workpiece 104 in response to operation 1302 being performed.

Second section 120 of workpiece 104 may be held in a substantially fixed position relative to the magnetic portion of each structure in group of structures 126 (operation 1304). Operation 1304 may be performed using, for example, without limitation, positioning system 148.

Group of locking magnets 128 may be positioned at second side 110 of workpiece 104 (operation 1306). Group of locking magnets 128 may exert number of attractive forces 129 that may be configured to cause a clamping magnet associated with the magnetic portion of each structure in group of structures 126 to move towards second section 120 of workpiece 104 (operation 1308).

For example, without limitation, attractive force 144 exerted by locking magnet 142 positioned on second surface 114 of workpiece 104 may cause clamping magnet 140 associated with magnetic portion 134 of structure 130 to rotate towards first surface 112 of workpiece 104. Clamping magnet 140 and magnetic portion 134 of structure 130 may rotate until magnetic portion 134 comes into contact with first surface 112 of second section 120 of workpiece 104.

First section 118 of workpiece 104 may bend relative to second section 120 of workpiece 104 in response to the magnetic portion of each structure in group of structures 126 moving towards second section 120 of workpiece 104 (operation 1310), with the process terminating thereafter. In operation 1310, first section 118 may bend at groove 116 in workpiece 104. Further, rigid elongate member 150 may keep first section 118 of workpiece 104 substantially planar when first section 118 bends during operation 1310.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware.

When implemented in hardware, the hardware may, for example, take the form of integrated circuits that are manufactured or configured to perform one or more operations in the flowcharts or block diagrams. For example, one or more of the operations in FIG. 13 may be implemented using a robotic system.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 14:
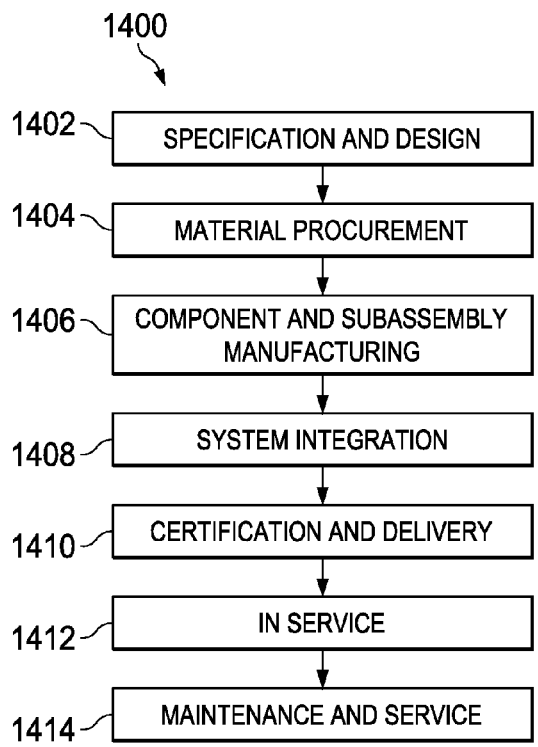
FIG. 14 is an illustration of an aircraft manufacturing and service method in the form of a block diagram in accordance with an illustrative embodiment.
Figure 15:
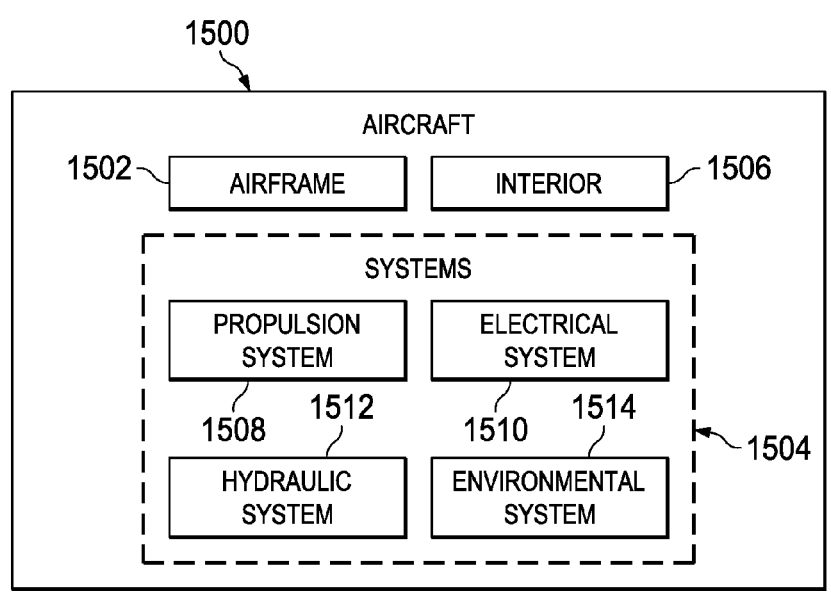
FIG. 15 is an illustration of an aircraft in the form of a block diagram in accordance with an illustrative embodiment.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method in the form of a block diagram is depicted in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft in the form of a block diagram is depicted in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14.

For example, without limitation, bending system 102 in FIG. 1 may be used to form and/or rework parts for aircraft 1500 during one or more of component and subassembly manufacturing 1406, system integration 1408, routine maintenance and service 1414 and other stages during the processes of aircraft manufacturing and service method 1400 in FIG. 14. For example, without limitation, bending system 102 in FIG. 1 may be used to form one or more parts for an overhead bin for aircraft 1500 in FIG. 15, such as bin structure 1200 in FIG. 12.

One or more apparatus embodiments, method embodiments, or a combination thereof may be utilized while aircraft 1500 is in service 1412 and/or during maintenance and service 1414 in FIG. 14. The use of a number of the different illustrative embodiments may substantially expedite the assembly of and/or reduce the cost of aircraft 1500.

Thus, the different illustrative embodiments may provide a method and apparatus for bending a flange to form an angled flange for a part. The different illustrative embodiments may provide a bending system, such as bending system 102 in FIG. 1, configured to form angled flange 125 for part 105. Bending system 102 may have a size and weight configured for portability and for use on a moving line or an assembly line. Further, bending system 102 may have a size and weight that allow bending system 102 to be used inside a curing system, an oven, or an autoclave without drawing heat away from workpiece 104 in amounts outside of selected tolerances.

Additionally, the number of structures used in group of structures 126 for bending system 102 to form angled flange 125 may be adjusted based on the length of workpiece 104. In this manner, a single bending system 102 may be used with different sizes of workpieces.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a structure comprising a retaining portion and a magnetic portion in which the retaining portion of the structure is configured to receive a first section of a workpiece such that a second section of the workpiece is positioned at an angle relative to the magnetic portion of the structure and the magnetic portion of the structure is positioned at a first side of the workpiece, wherein the structure is one structure in a group of structures;
a locking magnet configured to exert an attractive force that causes the magnetic portion of the structure to move towards the second section of the workpiece when the locking magnet is positioned at a second side of the workpiece, wherein the locking magnet is one locking magnet in a group of locking magnets; and
the group of structures and the group of locking magnets form a bending system.

2. The apparatus of claim 1, wherein the first section of the workpiece bends relative to the second section of the workpiece when the magnetic portion of the structure moves towards the second section of the workpiece and the second section of the workpiece remains in a substantially fixed position relative to the magnetic portion of the structure.

3. The apparatus of claim 2 further comprising:
a positioning system configured to hold the second section of the workpiece in the substantially fixed position while the magnetic portion of the structure moves towards the second section of the workpiece.

4. The apparatus of claim 2 further comprising:
a rigid elongate member, wherein the retaining portion of the structure is configured to receive both the rigid elongate member and the first section of the workpiece.

5. The apparatus of claim 4, wherein the retaining portion of the structure is configured to receive both the rigid elongate member and the first section of the workpiece such that the first section of the workpiece remains substantially planar when the first section of the workpiece bends relative to the second section of the workpiece.

6. The apparatus of claim 1 further comprising:
a clamping magnet associated with the magnetic portion of the structure, wherein the attractive force exerted by the locking magnet when the locking magnet is positioned at the second side of the workpiece causes the clamping magnet to move towards the second section of the workpiece until the magnetic portion of the structure contacts a surface of the second section of the workpiece.

7. The apparatus of claim 1, wherein the retaining portion of the structure comprises:
a slot configured to receive the first section of the workpiece when the retaining portion is placed over the first section of the workpiece.

8. The apparatus of claim 7, wherein the slot is configured to receive the first section of the workpiece and a rigid elongate member.

9. The apparatus of claim 8 further comprising:
a holding magnet located in the slot of the retaining portion of the structure and configured to hold the rigid elongate member in the slot.

10. The apparatus of claim 1, wherein a groove on the first side of the workpiece separates the first section of the workpiece from the second section of the workpiece.

11. The apparatus of claim 10, wherein the first section of the workpiece is a flange configured to bend relative to the second section of the workpiece at the groove to form an angled flange when the magnetic portion of the structure moves towards the second section of the workpiece and the second section of the workpiece remains in a substantially fixed position relative to the magnetic portion of the structure.

12. The apparatus of claim 1, wherein the workpiece comprises a flexible material in which the flexible material comprises at least one of a composite material, a flexible metal material, a flexible metal alloy, and a silicone material.

13. A bending system comprising:
a group of structures in which each structure in the group of structures comprises:
a retaining portion; and
a magnetic portion in which the retaining portion of the each structure has a slot configured to receive a first section of a workpiece such that a second section of the workpiece is positioned at an angle relative to the magnetic portion of the each structure and the magnetic portion of the each structure is positioned at a first side of the workpiece;
a group of locking magnets configured to exert a group of attractive forces;
a group of clamping magnets in which each clamping magnet in the group of clamping magnets is associated with the magnetic portion of a corresponding structure in the group of structures and in which the group of attractive forces exerted by the group of locking magnets when the group of locking magnets is positioned at a second side of the workpiece causes the group of clamping magnets to move towards the second section of the workpiece while the second section of the workpiece remains in a substantially fixed position until the magnetic portion of the each structure contacts a surface of the second section of the workpiece in which the first section of the workpiece bends relative to the second section of the workpiece to form an angled flange when the magnetic portion of the structure moves towards the second section of the workpiece; and
a rigid elongate member, wherein the slot is configured to receive both the rigid elongate member and the first section of the workpiece such that the first section of the workpiece remains substantially planar when the first section of the workpiece bends relative to the second section of the workpiece.

\* \* \* \* \*